United States Patent
Park et al.

(10) Patent No.: US 10,853,921 B2
(45) Date of Patent: Dec. 1, 2020

(54) METHOD AND APPARATUS FOR IMAGE SHARPENING USING EDGE-PRESERVING FILTERS

(71) Applicant: Samsung Electronics Co., Ltd., Gyeonggi-do (KR)

(72) Inventors: Seongjun Park, San Jose, CA (US); Shuangquan Wang, San Diego, CA (US); Jungwon Lee, San Diego, CA (US)

(73) Assignee: Samsung Electronics Co., Ltd

( * ) Notice: Subject to any disclaimer, the term of this patent is extended or adjusted under 35 U.S.C. 154(b) by 75 days.

(21) Appl. No.: 16/362,021

(22) Filed: Mar. 22, 2019

(65) Prior Publication Data

US 2020/0250797 A1 Aug. 6, 2020

Related U.S. Application Data

(60) Provisional application No. 62/800,165, filed on Feb. 1, 2019.

(51) Int. Cl.
*G06T 5/20* (2006.01)
*G06T 5/00* (2006.01)
*G06T 5/50* (2006.01)

(52) U.S. Cl.
CPC ............ *G06T 5/004* (2013.01); *G06T 5/20* (2013.01); *G06T 5/50* (2013.01); *G06T 2207/20224* (2013.01)

(58) Field of Classification Search
CPC combination set(s) only.
See application file for complete search history.

(56) References Cited

U.S. PATENT DOCUMENTS

| | | | |
|---|---|---|---|
| 5,602,934 A * | 2/1997 | Li | G01R 33/56 382/128 |
| 8,219,370 B1 | 7/2012 | DiVerdi et al. | |
| 8,335,675 B1 | 12/2012 | DiVerdi et al. | |
| 2003/0189579 A1* | 10/2003 | Pope | G06T 3/403 345/660 |
| 2005/0063586 A1* | 3/2005 | Munsil | H04N 1/4053 382/162 |
| 2009/0052772 A1 | 2/2009 | Speirs et al. | |
| 2011/0064327 A1* | 3/2011 | Dagher | G06T 5/004 382/263 |
| 2013/0071028 A1 | 3/2013 | Schiller et al. | |

(Continued)

*Primary Examiner* — Tsung Yin Tsai
(74) *Attorney, Agent, or Firm* — The Farrell Law Firm, P.C.

(57) ABSTRACT

A method and an apparatus are provided for sharpening an image, by an image processor of an electronic device. An input image is received. Low pass filtering is applied to the input image to generate a first image and a second image. A kernel size of first image and the second image are different. Edge preserving filtering is applied to the input image to generate a third image and a fourth image. A kernel size of the third image and the fourth image are different. The first image is subtracted from the third image to obtain a first resulting image. The first image has a larger kernel size than the third image. The second image from the fourth image to obtain a second resulting image. The second image has a larger kernel size than the fourth image. The first resultant image, the second resultant image, and the input image are summed to generate a sharpened image.

20 Claims, 6 Drawing Sheets

(56) References Cited

U.S. PATENT DOCUMENTS

| | | |
|---|---|---|
| 2013/0329991 A1 | 12/2013 | Nashizawa |
| 2015/0310593 A1* | 10/2015 | Kobayashi .............. G06T 5/002 382/275 |
| 2015/0317776 A1 | 11/2015 | Sugimoto et al. |
| 2019/0304111 A1* | 10/2019 | Zatzarinni ................ G06T 5/50 |

* cited by examiner

METHOD AND APPARATUS FOR IMAGE SHARPENING USING EDGE-PRESERVING FILTERS

PRIORITY

This application is based on and claims priority under 35 U.S.C. § 119(e) to a U.S. Provisional Patent Application filed on Feb. 1, 2019 in the United States Patent and Trademark Office and assigned Ser. No. 62/800,165, the contents of which are incorporated herein by reference.

FIELD

The present disclosure relates generally to an image processing system, and more particularly, to a method and an apparatus for image sharpening in an image capturing system.

BACKGROUND

Image processing research is ongoing in attempts to produce cameras capable of capturing high-quality images that are satisfactory for meeting human vision standards. However, various image factors remain unsatisfactory in a human visual system (HVS). Such image factors may include, for example, dynamic range, color gamut, color accuracy, distortion, uniformity, blurriness, texture, and edges. Among these image factors, sharpening is one of the most effective ways to provide a more realistic view by improving the image quality of edges and texture areas that are degraded by limitations of camera sensors and noise reduction (NR) algorithms. However, as a trade-off, sharpening can produce even noisier images. It is challenging to provide both sharpening and NR processing with various pixel values. For example, it is difficult to discriminate noise and texture components since they have detailed pixel fluctuation and vibration.

A sharpening process includes high-pass filtering (HPF) of an image signal. In a spatial domain, an image is divided into smooth regions that have little pixel intensity variation and detail regions that have large pixel intensity variation. For example, a smooth region may include a portion of the image capturing the sky, human skin, or a face, while a detail region may include a portion of the image capturing grass, leaves, or hair. In a frequency domain, the smooth region includes mostly low-frequency components, while the detail region includes high-frequency components.

SUMMARY

According to one embodiment, a method is provided for sharpening an image, by an image processor of an electronic device. An input image is received. Low pass filtering is applied to the input image to generate a first image and a second image. A kernel size of the first image and the second image are different. Edge preserving (EP) filtering is applied to the input image to generate a third image and a fourth image. A kernel size of the third image and the fourth image are different. The first image is subtracted from the third image to obtain a first resulting image. The first image has a larger kernel size than the third image. The second image from the fourth image to obtain a second resulting image. The second image has a larger kernel size than the fourth image. The first resultant image, the second resultant image, and the input image are summed to generate a sharpened image.

According to one embodiment, an electronic device is provided that includes a processor and a non-transitory computer readable storage medium storing instructions. When executed the instructions cause the processor to receive an input image, apply low pass filtering to the input image to generate a first image and a second image. A kernel size of the first image and the second image are different. The instructions also cause the processor to apply edge preserving filtering to the input image to generate a third image and a fourth image. A kernel size of the third image and the fourth image are different. The instructions additionally cause the processor to subtract the first image from the third image to obtain a first resulting image, and subtract the second image from the fourth image to obtain a second resulting image. The first image has a larger kernel size than the third image, and the second image has a larger kernel size than the fourth image. The instructions further cause the processor to sum the first resultant image, the second resultant image, and the input image to generate a sharpened image.

According to one embodiment, an image processor of an electronic is provided and includes a medium low pass filter that applies low pass filtering to an input image to obtain a first moderately-blurred image, and a wide low pass filter that applies low pass filtering to the input image to obtain a highly-blurred image. The image processor also includes an edge-preserving narrow filter that applies edge-preserving filtering to the input image to obtain a slightly-blurred image, and an edge-preserving medium filter that applies edge-preserving filtering to the input image to obtain a second moderately-blurred image. Additionally, the image processor includes a first combiner that subtracts the first moderately-blurred image from the slightly-blurred image to obtain a medium sharp image, and a second combiner that subtracts the highly-blurred image from the second moderately-blurred image to obtain a wide sharp image. The image processor further includes a third combiner that sums the medium sharp image, the wide sharp image, and the input image to obtain a sharpened image.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
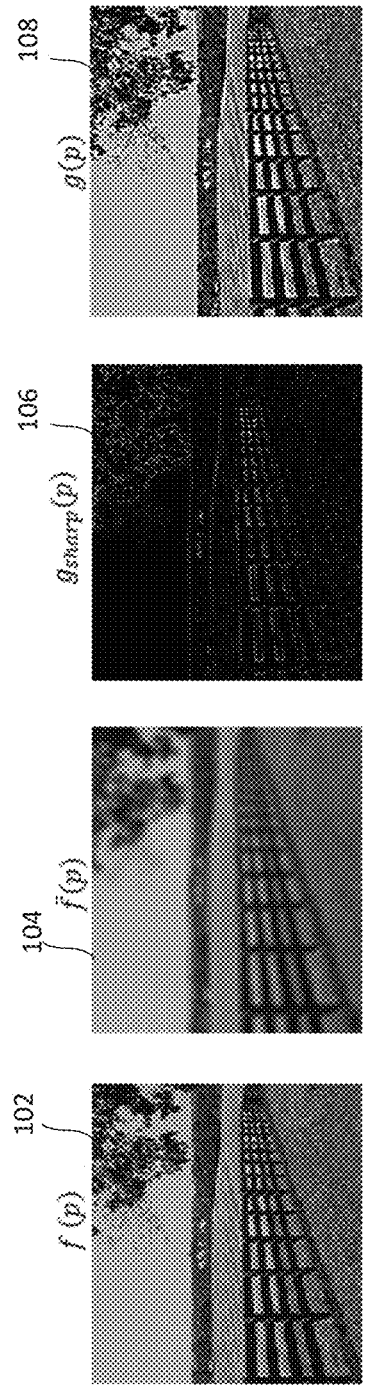
FIG. 1 is a diagram illustrating exemplary images for performing a sharpening process.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, such as, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

According to one embodiment, a method and an apparatus are provided for performing image sharpening using steps of unsharp masking, multi-scale decomposition, and edge-preserving filtering. Unsharp masking is the most common method that smart phones, digital single-lens reflex camera (DSLR) manufacturers, and image editors (e.g., PHOTOSHOP™) have adopted to perform image sharpening. Multi-scale image decomposition is able to enhance the sharpness by providing individual control for strong and weak edges. The present disclosure provides sharpening that effectively discriminates smooth and detail regions, and boosts sharpening selectively only in detail regions using edge-preserving filtering.

As described above, the present system performs sharpening based on a sharp adder technique known as unsharp masking. Images can be sharpened by adding high-frequency components to input images, as expressed in Equations (1) and (2) below:

$$g_{sharp}(p) = f(p) - \bar{f}(p) \qquad (1)$$

$$g(p) = f(p) + k \cdot g_{sharp}(p) \qquad (2)$$

where f(p) denotes an input image, $\bar{f}$(p) denotes a low-frequency (blurred) version of the input image, p is a pixel position that could be a 2D vector (x,y) for gray images or a 3D vector (x,y,z) for color images, where z is color channel index.

FIG. 1 is a diagram illustrating exemplary images for performing a sharpening process. First image 102 represents the input image f(p), second image 104 represents the low-frequency version of the input image $\bar{f}$(p), third image 106 represents a resulting sharp image $g_{sharp}$(p) obtained when the second image 104 is extracted from the first image 102, and fourth image 108 represents a sharpened image g(p) obtained when a scaling factor k is applied to the third image 106 and then combined with the first image 102.

According to one embodiment, the unsharp masking scheme is improved by incorporating multiscale image decomposition. To produce $g_{sharp}$, instead of using Equation . . . (1), which only requires an input image f(x, y), multi-level low frequency blurring is generated without the input image. Thus, multiscale unsharp masking can be written as Equation (3) below:

$$g(p) = f(p) + k_1(f_n(p) - f_m(p)) + k_2(f_m(p) - f_w(p)) \quad (3)$$
$$= f(p) + k_1 g_{msharp}(p) + k_2 g_{wsharp}(p)$$

where $f_n(p)$, $f_m(p)$, and $f_w(p)$ are slightly-, moderately-, and highly-blurred images, respectively. Generally, the filter that is most commonly used to generate a blurred image is a Gaussian kernel. As the kernel size increases (narrow, medium, and wide), images become more blurred. For example, to build $f_n(p)$, $f_m(p)$, and $f_w(p)$, 3×3, 5×5, and 7×7 Gaussian kernels may be used, respectively, as shown in Equation (4) below:

$$f_n(p) = f(p)*G_{3\times 3}, \ f_m(p) = f(p)*G_{5\times 5}, \ f_w(p) = f(p)*G_{7\times 7} \quad (4)$$

Figure 2:
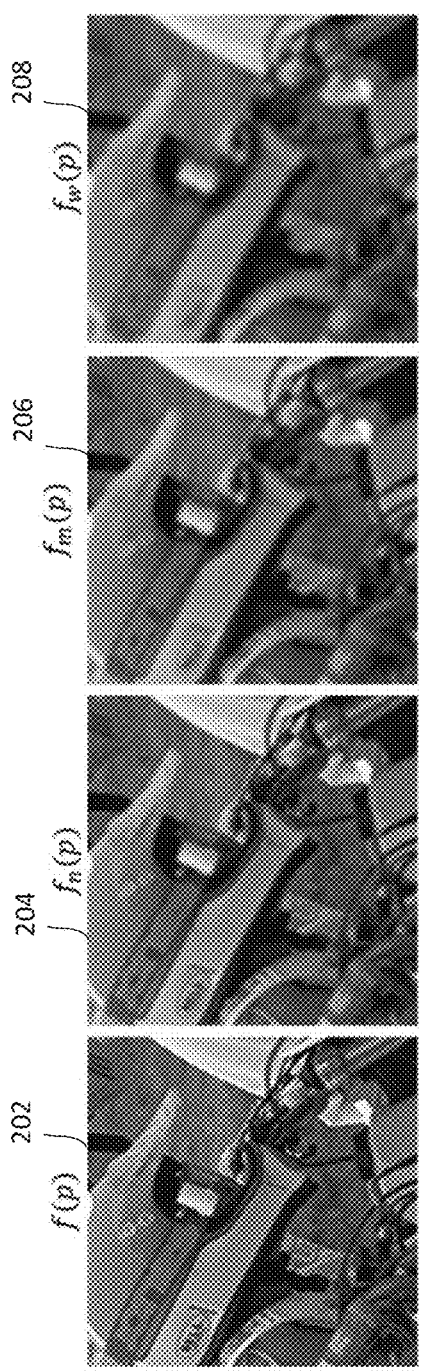
FIG. 2 is a diagram illustrating blurred images after an input image is convolved with Gaussian kernels.

FIG. 2 is a diagram illustrating blurred images after an input image is convolved with Gaussian kernels. This multiscale image decomposition with piecewise smooth layers allows for the individual control of edge, detail, and smooth regions. FIG. 2 illustrates an input image 202 (f(p)), a slightly-blurred image 204 ($f_n(p)$) obtained by applying 3×3 Gaussian kernels (narrow) to the input image 202, a moderately-blurred image 206 ($f_m(p)$) obtained by applying 5×5 Gaussian kernels (medium) to the input image 202, and a highly-blurred image 208 ($f_w(p)$) obtained by applying 7×7 Gaussian kernels (wide) to the input image 202.

As noted with respect to Equation (3), moderately-blurred image 206 is subtracted from slightly-blurred image 204 to produce a medium sharp image a $g_{msharp}(p)$, and highly-blurred image 208 is removed from moderately-blurred image 206 to produce a wide sharp image $g_{wsharp}(p)$. A first scaling factor $k_1$ is applied to the medium sharp image $g_{msharp}(p)$, and a second scaling factor $k_2$ is applied to the wide sharp image $g_{wsharp}(p)$, before combining both with input image 202 to obtain sharpened image g(p).

A good sharpening process must discriminate smooth and detail regions effectively, and selectively boost sharpness in only the detail regions. Linear filters, such as, for example, Gaussian kernels, which equally effect all areas of an image, may be limited in dividing the image into smooth and detail areas. Although the combination of unsharp masking and multiscale decomposition helps boost sharpness, there remains a possibility that edge information is lost since this combination depends only on simple low pass filter (LPF) kernels, which blur all areas. According to one embodiment, edge-preserving (EP) filters are incorporated into the combination of unsharp masking and multiscale decomposition. The sharpening model in Equation . . . (3) is reconfigured as shown in Equation (5) below:

$$g(p) = f(p) + k_1(f_n^e(p) - f_m(p)) + k_2(f_m^e(p) - f_w(p)) \quad (5)$$
$$= f(p) + k_1 g_{msharp}^e(p) + k_2 g_{wsharp}^e(p)$$

where superscript e denotes output from an EP filter. EP filters behave in a manner similar to that of LPF filters in smooth regions, but attempts to keep the original pattern at edge regions with large pixel transition.

Figure 3A:
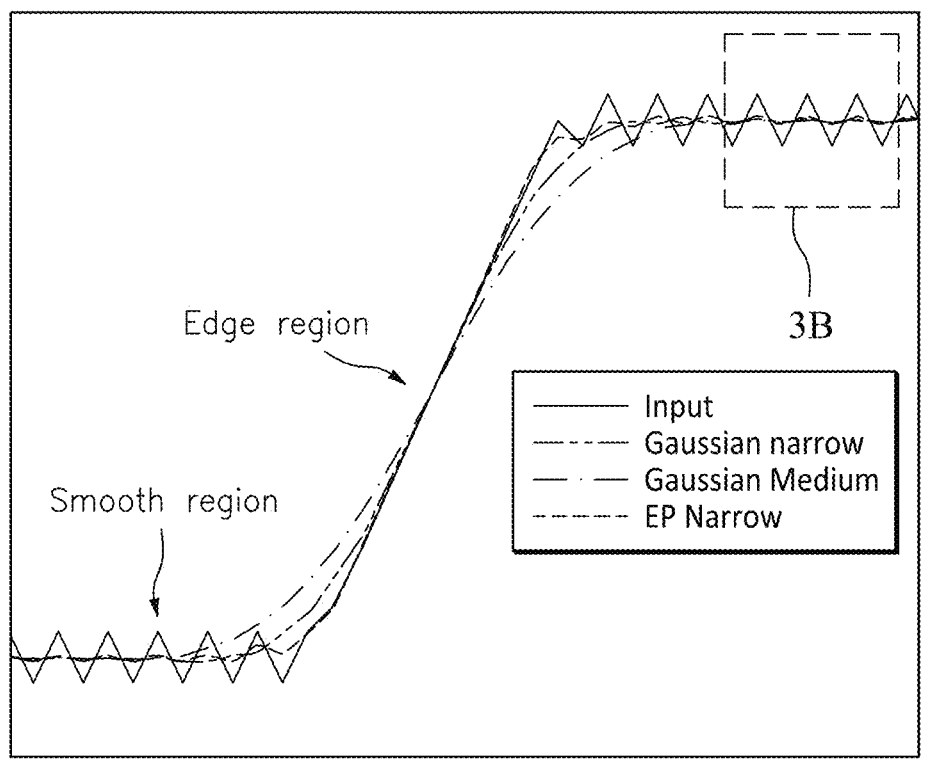
FIGS. 3A-3D includes graphs illustrating how sharp signals ($g^e_{msharp}$) are obtained when EP filters are applied, according to one embodiment.
Figure 3B:
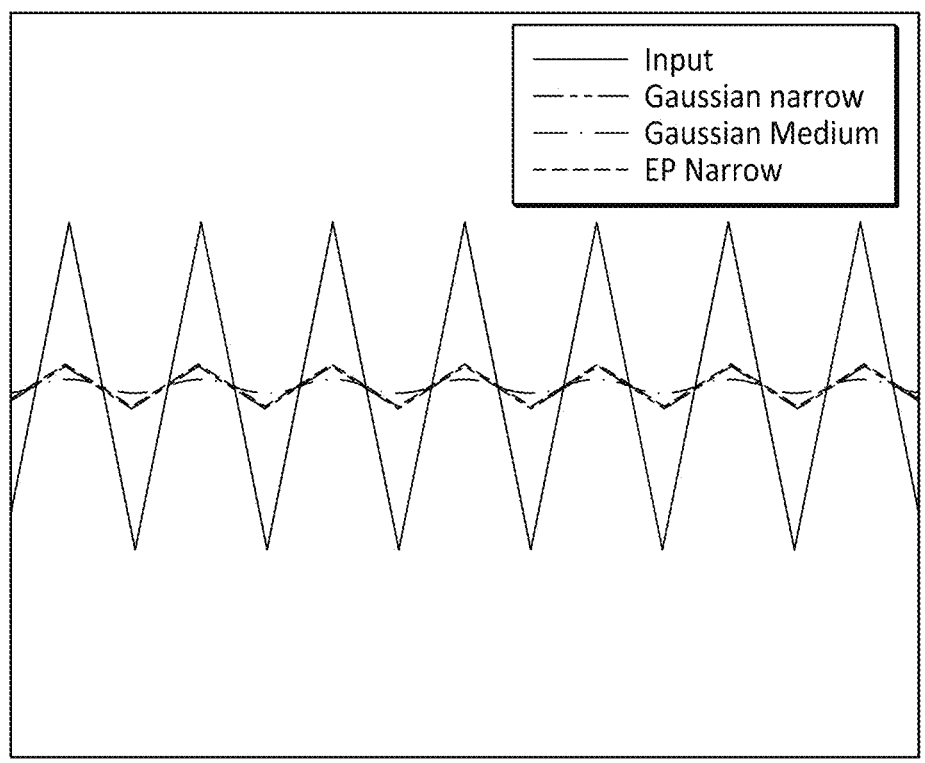
Figure 3C:
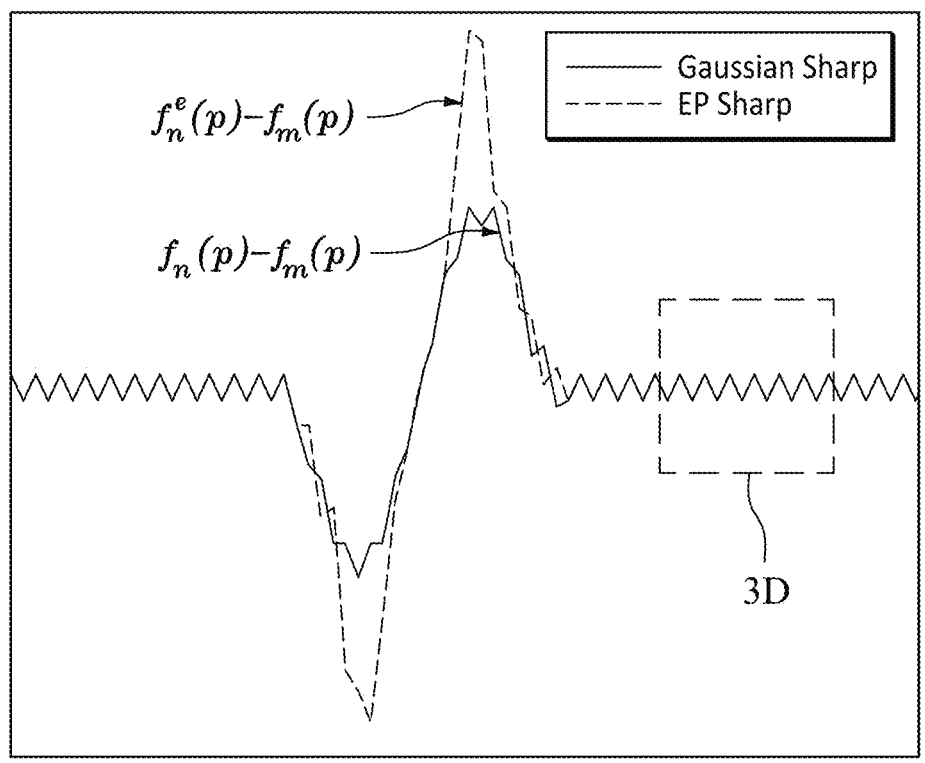
Figure 3D:
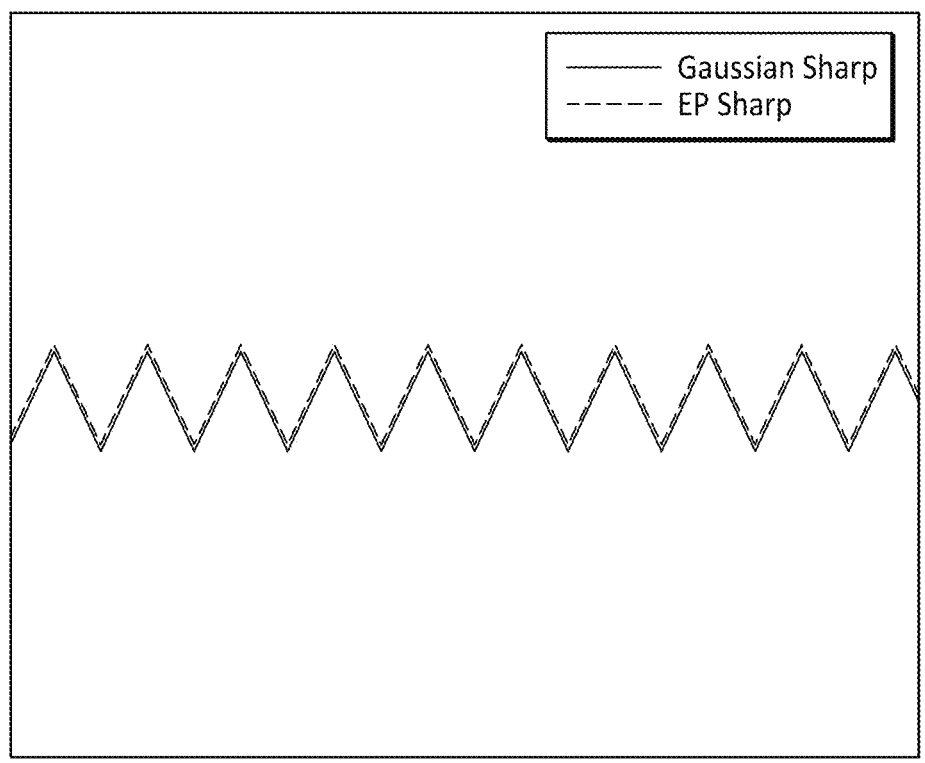

FIGS. 3A-3D include graphs illustrating how sharp signals ($g_{msharp}^e$) are obtained when EP filters are applied, according to one embodiment. As shown in FIG. 3A, a Gaussian slightly-blurred image $f_n(p)$ is closer to values of an input image than a Gaussian moderately-blurred image $f_m(p)$ at an edge region, but an EP slightly-blurred image $f_n^e(p)$ is much closer to the input image than $f_n(p)$. However, from FIG. 3B, it is shown that in the smooth region, $f_n^e(p)$ and $f_n(p)$ have the same characteristics, which are sharper than $f_m(p)$ Therefore, extraction of $f_m(p)$ from $f_n^e(p)$ (EP sharp) in FIG. 3C has a larger contrast than an extraction of $f_m(p)$ from $f_n(p)$ (Gaussian sharp), while the smooth region has the same performance, as shown in FIG. 3D. Accordingly, higher pass filters should be replaced with edge preserving filters. The opposite case (i.e., $f_n(p) - f_m^e(p)$) does not have an edge-preserving effect.

According to one embodiment, a bilateral filter (BF) may be used as an EP filter. A BF weighs neighborhood pixels' priorities in accordance with both spatial relevance and intensity relevance, which enables the recognition of edge and smooth areas. This approach is mathematically expressed as Equation (6) below:

$$O(p) = \frac{1}{N_p} \sum_{q \in \Omega} I(q) G_{\sigma_s}(\|p-q\|) G_{\sigma_r}(\|I(p) - I(q)\|) \quad (6)$$

$$N_P = \sum_{q \in \Omega} G_{\sigma_s}(\|p-q\|) G_{\sigma_r}(\|I(p) - I(q)\|)$$

where I is an input image, O is a bilateral filtered output image, p is a processing pixel, q is a neighborhood pixel within the window Ω, $G_{\sigma_s}$ and $G_{\sigma_r}$ are weight functions for spatial distance and intensity difference, respectively. p, q are pixel locations.

According to another embodiment of the present disclosure, a guided filter (GF) may be used as an EP filter. The ground model of a GF is that output O is a linear transform under a guidance image G within a neighborhood window w at pixel p, as in Equation (7) below:

$$O(q) = a_p G(q) + b_p, \ q \in w_p \quad (7)$$

where ($a_p$, $b_p$) are coefficients that need to be determined. The guidance image G resembles the input image I except that O has edges only if G has an edge (i.e., $=a \nabla G$), which makes this filter edge-preserving.

The present system may determine the coefficients ($a_p$, $b_p$) to minimize the difference between O and I, which is expressed in Equation (8) below:

$$E(a_p, b_p) = \sum_{q \in w_p} ((a_p G(q) + b_p - I(q))^2 + \varepsilon a_p^2) \quad (8)$$

where ε is a regularization parameter that increases the smoothness of the filter as the value increases. The coefficients ($a_p$, $b_p$) are provided as the solution to the linear regression of Equation . . . (8), as shown in Equations (9) and (10) below:

$$a_p = \frac{\frac{1}{|w|} \Sigma_{q \in w_p} G(q) I(q) - \mu_p \overline{I}(p)}{\sigma_p^2 + \varepsilon} \quad (9)$$

-continued $$b_p = \bar{I}(p) - a_p\mu_p \quad (10)$$

where $\mu_p$ and $\sigma_p$ are the mean and variance of G in the neighborhood $w_p$, $|w|$ is the number of pixels of the kernel $w_p$, and $\bar{I}(p)$ is the mean of input image I in $w_p$.

A GF has been used for manifold applications such as high dynamic range (HDR), image matting, and dehazing. In particular, with respect to the EP filter, since there is no guidance image in most cases, the present system may set the input image as the guidance image (i.e. I=G). Accordingly, Equations . . . (9) and . . . (10) are summarized as follows in Equations (11) and (12):

$$a_p = \frac{\frac{1}{|w|}\Sigma_{q \in \omega_p} I(q)I(q) - \bar{I}(p)\bar{I}(p)}{\sigma_p^2 + \varepsilon} = \frac{\sigma_p^2}{\sigma_p^2 + \varepsilon} \quad (11)$$

$$b_p = \bar{I}(p) - a_p\mu_p = \mu_p\left(1 - \frac{\sigma_p^2}{\sigma_p^2 + \varepsilon}\right) = \mu_p\frac{\varepsilon}{\sigma_p^2 + \varepsilon} \quad (12)$$

By combining Equations . . . (11) and . . . (12) into Equation (7), the final output image is obtained through Equation (13) below:

$$O(q) = \frac{\sigma_p^2}{\sigma_p^2 + \varepsilon}I(q) + \frac{\varepsilon}{\sigma_p^2 + \varepsilon}\mu_p \quad (13)$$

It is noted that that the first term of Equation . . . (13) gets closer to the input as the edge strength ($\sigma_p^2$) increases (detail region), whereas the second term gets closer to the average of neighborhood ($\mu_p$) as the edge strength decreases (smooth region), which is why the GF has an edge-preserving property.

The purpose of the EP filters is to blur the smooth region of the image and maintain the texture in the detail region of the image, as much as possible.

For a smooth region, each of 5×5 Gaussian kernel, BF with parameters $\sigma_s=1.2$, $\sigma_r=0.05$, 5×5 kernel, and GF with $\varepsilon=30$, 5×5 kernel, are similar in blurring an input image. However, for a detail region, all EP filters maintain the texture better than 5×5 Gaussian kernel, which is more significantly blurred.

Figure 4:
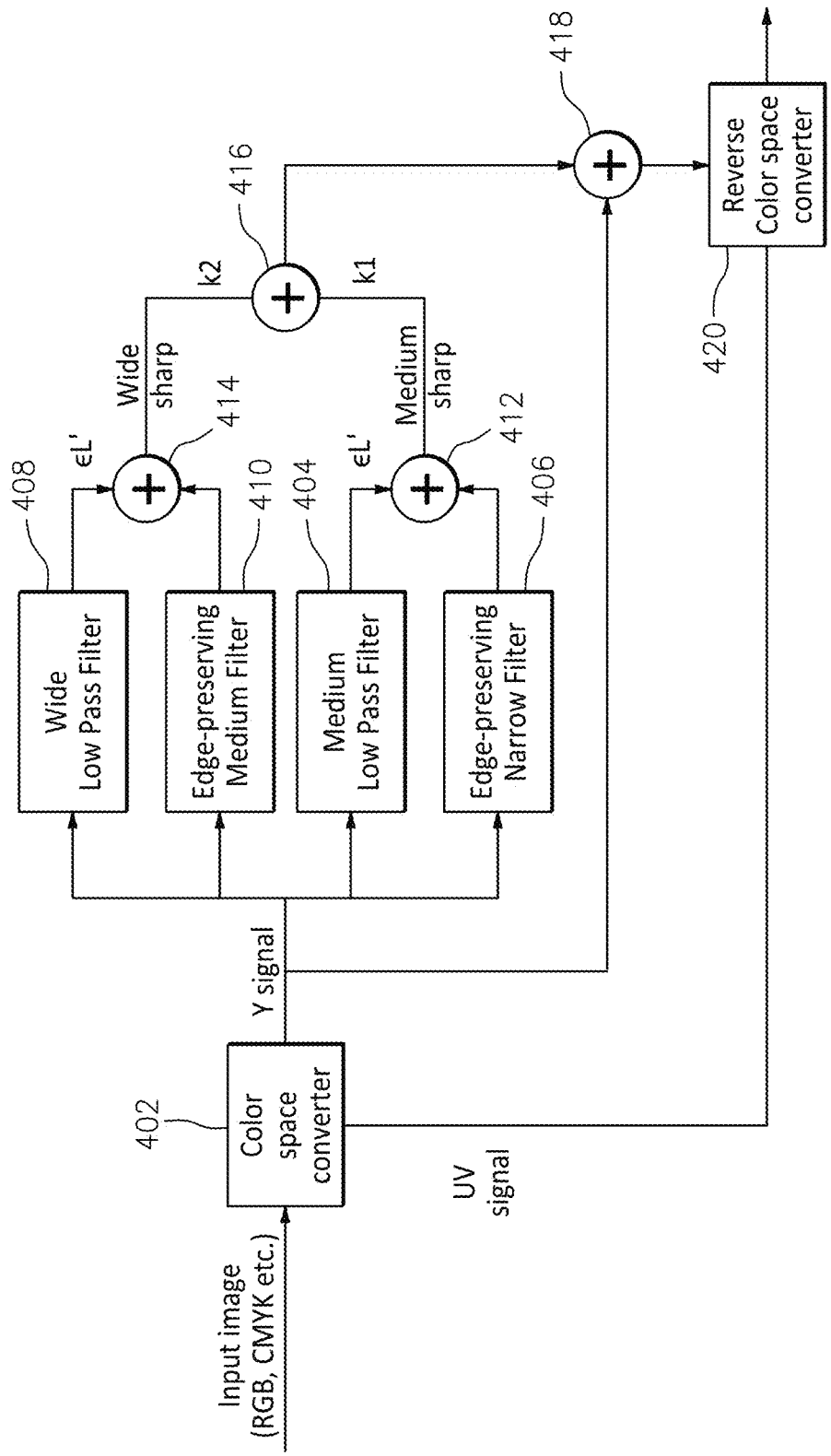
FIG. 4 is a diagram illustrating image sharpening using the combination of unsharp masking and multiscale decomposition with EP filters, according to one embodiment.

FIG. 4 is a diagram illustrating image sharpening using the combination of unsharp masking and multiscale decomposition with EP filters, according to one embodiment. Two LPF filters and two EP filters (either BF or GF) are used.

An image is input to a color space converter 402, where the image is converted from an original color space to a YUV color format. Sharp signals have a single channel (luminance, Y) 2D shape after the color space converter 402. A Y signal that is output from the color space converter 402 is provided to a medium LPF 404 to generate a first moderately-blurred image. The Y signal is provided to an EP narrow filter 406 to generate a slightly-blurred image. The Y signal is provided to a wide LPF 408 to generate a highly-blurred image. The Y signal is provided to an EP medium filter 410 to generate a second moderately-blurred image.

The first moderately-blurred image is subtracted from the slightly blurred image at a first combiner 412 to generate a medium sharp image, and the highly-blurred image is subtracted from the second moderately blurred image at a second combiner 414 to generate a wide sharp image. A first scaling factor k1 is applied to the medium sharp image and a second scaling factor k2 is applied to the wide sharp image before combining the results at a third combiner 416. The result from third combiner 416 is combined with the original Y signal output from the color space converter 402 at fourth combiner 418 to obtain a sharpened image. This combined result is provided to a reverse color space converter 420 with a UV signal from the color space converter 402 to return the image from the YUV color format to an original color space.

Figure 5:
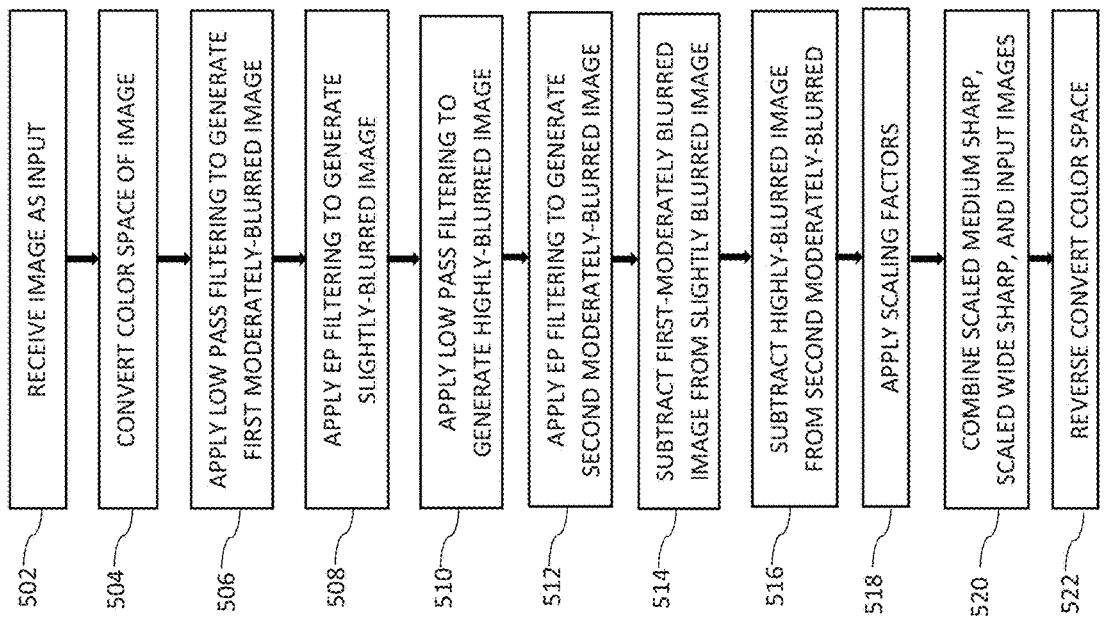
FIG. 5 is a flowchart illustrating a method for sharpening an image, according to one embodiment.

FIG. 5 is a flowchart illustrating a method for sharpening an image, according to one embodiment. An image is received as input, at 502. A color space of the image is converted from an original color format (e.g., RGB (red, green, and blue), CMYK (cyan, magenta, yellow, and black), or Bayer RGB (red, first green, second green, and blue)) to a YUV color format having a Y signal and UV signal, at 504. Low pass filtering is applied to the Y signal of the input image to generate a first moderately-blurred image with medium kernel size, at 506. EP filtering is applied to the Y signal of the input image to generate a slightly-blurred image with narrow kernel size, at 508. Low pass filtering is applied to the Y signal of the input image to generate a highly-blurred image with wide kernel size, at 510. EP filtering is applied to the Y signal of the input image to generate a second moderately-blurred image with medium kernel size, at 512.

The first moderately-blurred image is subtracted from the slightly-blurred image to obtain a medium sharp image, at 514, and the highly-blurred image is subtracted from the second moderately-blurred image to obtain wide sharp image, at 516. A first scaling factor is applied to the medium sharp image, and a second scaling factor is applied to the wide sharp image, at 518. The scaled medium sharp image, the scaled wide sharp image, and the Y signal of the input image are combined to generate a sharpened image, at 520. A color space of the sharpened image is reverse converted from the YUV format to the original format using the UV signal, at 522.

Figure 6:
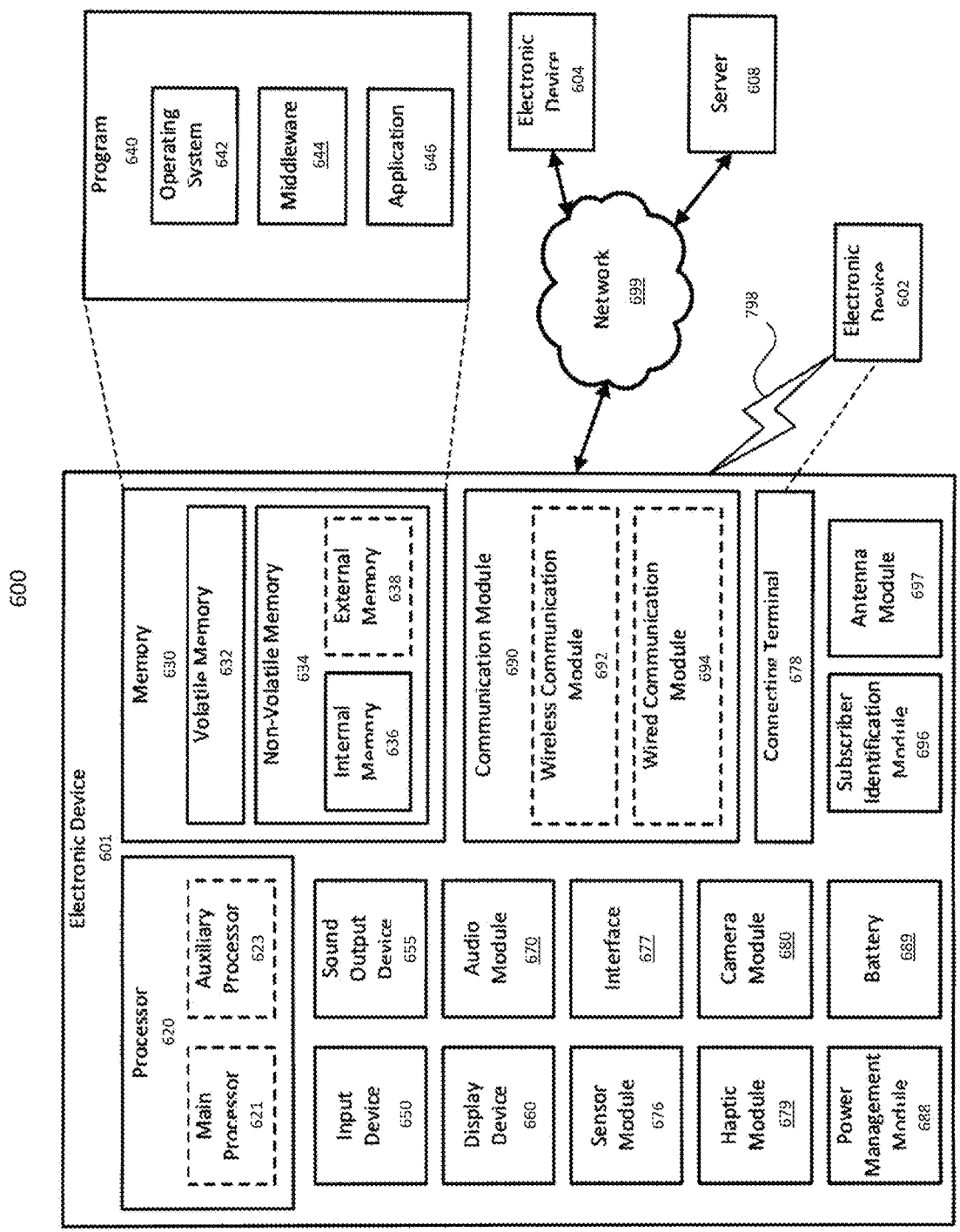
FIG. 6 is a block diagram of an electronic device in a network environment, according to one embodiment

FIG. 6 is a block diagram of an electronic device in a network environment, according to one embodiment. Referring to FIG. 6, an electronic device 601 in a network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697. In one embodiment, at least one (e.g., the display device 660 or the camera module 680) of the components may be omitted from the electronic device 601, or one or more other components may be added to the electronic device 601. In one embodiment, some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute, for example, software (e.g., a program 640) to control at least one other component (e.g., a hardware or a software component) of the electronic device 601 coupled with the processor 620, and may perform various data processing or computations. As at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to one embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by another component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to one embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to one embodiment, the audio module 670 may obtain the sound via the input device 650, or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. According to one embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. According to one embodiment, the connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. According to one embodiment, the haptic module 679 may include, for example, a motor, a piezoelectric element, or an electrical stimulator.

The camera module 680 may capture a still image or moving images. According to one embodiment, the camera module 680 may include one or more lenses, image sensors, image signal processors, or flashes.

The power management module 688 may manage power supplied to the electronic device 601. The power management module 688 may be implemented as at least part of, for example, a power management integrated circuit (PMIC).

The battery 689 may supply power to at least one component of the electronic device 601. According to one embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. According to one embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to one embodiment, the antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

One embodiment may be implemented as software (e.g., the program 640) including one or more instructions that are stored in a storage medium (e.g., internal memory 636 or external memory 638) that is readable by a machine (e.g., the electronic device 601). For example, a processor of the electronic device 601 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for sharpening an image, by an image processor of an electronic device, the method comprising:
    receiving an input image;
    applying low pass filtering to the input image to generate a first image and a second image, wherein a kernel size of the first image and the second image are different;
    applying edge preserving filtering to the input image to generate a third image and a fourth image, wherein a kernel size of the third image and the fourth image are different;
    subtracting the first image from the third image to obtain a first resulting image, wherein the first image has a larger kernel size than the third image;

subtracting the second image from the fourth image to obtain a second resulting image, wherein the second image has a larger kernel size than the fourth image; and summing the first resultant image, the second resultant image, and the input image to generate a sharpened image.

2. The method of claim 1, further comprising:

converting a color space of the input image from an original color space to a YUV color format having a Y signal and a UV signal, wherein the low pass filtering and edge preserving filtering are applied to the Y signal of the input image, and the sharpened image is generated using the Y signal of the input image; and reverse converting the color space of the sharpened image from the YUV format to an original color space using the UV signal of the input image.

3. The method of claim 2, wherein the original color space comprises one of RGB (red, green, and blue), CMYK (cyan, magenta, yellow, and black), and Bayer RGB (red, first green, second green, and blue).

4. The method of claim 2, wherein applying low pass filtering to the input image comprises:

applying low pass filtering to the Y signal of the input image to generate the first image with a medium kernel size, wherein the first image is a first moderately-blurred image; and applying low pass filtering to the Y signal of the input image to generate the second image with a wide kernel size, wherein the second image is a highly-blurred image.

5. The method of claim 4, wherein the low pass filtering is Gaussian filtering.

6. The method of claim 2, wherein applying edge preserving filtering to the input image comprises:

applying edge preserving filtering to the Y signal of the input image to generate the third image with a narrow kernel size, wherein the third image a slightly-blurred image; and applying edge preserving filtering to the Y signal of the input image to generate the fourth image with a medium kernel size, wherein the fourth image is a second moderately-blurred image.

7. The method of claim 6, wherein the edge preserving filtering is one of bilateral filtering and guided filtering.

8. The method of claim 1, wherein the first resulting image is a medium sharp image, and the second resulting image is a wide sharp image.

9. The method of claim 8, further comprising:

applying a first scaling factor to the medium sharp image before summing with the input image; and applying a second scaling factor to the wide sharp image before summing with the input image.

10. An electronic device, comprising:

a processor; and a non-transitory computer readable storage medium storing instructions that, when executed, cause the processor to:

receive an input image;

apply low pass filtering to the input image to generate a first image and a second image, wherein a kernel size of the first image and the second image are different;

apply edge preserving filtering to the input image to generate a third image and a fourth image, wherein a kernel size of the third image and the fourth image are different;

subtract the first image from the third image to obtain a first resulting image, wherein the first image has a larger kernel size than the third image;

subtract the second image from the fourth image to obtain a second resulting image, wherein the second image has a larger kernel size than the fourth image; and sum the first resultant image, the second resultant image, and the input image to generate a sharpened image.

11. The electronic device of claim 10, wherein the instructions further cause the processor to:

convert a color space of the input image from an original color space to a YUV color format having a Y signal and a UV signal, wherein the low pass filtering and edge preserving filtering are applied to the Y signal of the input image and the sharpened image is generated using the Y signal of the input image; and reverse convert the color space of the sharpened image from the YUV color format to an original color space using the UV signal of the input image.

12. The electronic device of claim 11, wherein the original color space comprises one of RGB (red, green, and blue), CMYK (cyan, magenta, yellow, and black), and Bayer RGB (red, first green, second green, and blue).

13. The electronic device of claim 11, wherein, in applying low pass filtering to the input image, the instructions further cause the processor to:

apply low pass filtering to the Y signal of the input image to generate the first image with a medium kernel size, wherein the first image is a first moderately-blurred image; and apply low pass filtering to the Y signal of the input image to generate the second image with a wide kernel size, wherein the second image is highly-blurred image.

14. The electronic device of claim 13, wherein the low pass filtering is Gaussian filtering.

15. The electronic device of claim 11, wherein, in applying edge preserving filtering to the input image, the instructions further cause to processor to:

apply edge preserving filtering to the Y signal of the input image to generate the third image with a narrow kernel size, wherein the third image is a slightly blurred image; and apply edge preserving filtering to the Y signal of the input image to generate the fourth image with a medium kernel size, wherein the fourth image is a second moderately-blurred image.

16. The electronic device of claim 15, wherein the edge preserving filtering is one of bilateral filtering and guided filtering.

17. The electronic device of claim 10, wherein the first resulting image is a medium sharp image, and the second resulting image is a wide sharp image.

18. The electronic device of claim 17, wherein the instructions further cause the processor to:

apply a first scaling factor to the medium sharp image before summing with the input image; and apply a second scaling fact to the wide sharp image before summing with the input image.

19. An image processor of an electronic comprising:

a medium low pass filter that applies low pass filtering to an input image to obtain a first moderately-blurred image;

a wide low pass filter that applies low pass filtering to the input image to obtain a highly-blurred image;

an edge-preserving narrow filter that applies edge-preserving filtering to the input image to obtain a slightly-blurred image;

an edge-preserving medium filter that applies edge-preserving filtering to the input image to obtain a second moderately-blurred image;

a first combiner that subtracts the first moderately-blurred image from the slightly-blurred image to obtain a medium sharp image;

a second combiner that subtracts the highly-blurred image from the second moderately-blurred image to obtain a wide sharp image; and a third combiner that sums the medium sharp image, the wide sharp image, and the input image to obtain a sharpened image.

20. The image processor of claim 19, wherein a first scaling factor is applied to the medium sharp image and a second scaling factor is applied to the wide sharp image prior to summing with the input image.

* * * * *